(12) United States Patent
Xing et al.

(10) Patent No.: US 10,908,493 B2
(45) Date of Patent: Feb. 2, 2021

(54) THREE-COORDINATE MAPPER AND MAPPING METHOD

(71) Applicant: Tianyi Xing, Tianjin (CN)

(72) Inventors: Tianyi Xing, Tianjin (CN); Yu Xing, Tianjin (CN)

(73) Assignee: TIANJIN CRDT FLUID CONTROL SYSTEM LTD., Tianjin (CN)

( * ) Notice: Subject to any disclaimer, the term of this patent is extended or adjusted under 35 U.S.C. 154(b) by 0 days.

(21) Appl. No.: 16/485,460

(22) PCT Filed: Feb. 13, 2018

(86) PCT No.: PCT/CN2018/076650
§ 371 (c)(1),
(2) Date: Aug. 13, 2019

(87) PCT Pub. No.: WO2018/149394
PCT Pub. Date: Aug. 23, 2018

(65) Prior Publication Data
US 2020/0003546 A1    Jan. 2, 2020

(30) Foreign Application Priority Data

Feb. 15, 2017  (CN) .......................... 2017 1 0079692
Feb. 15, 2017  (CN) .......................... 2017 1 0082499
Feb. 28, 2017  (CN) .......................... 2017 1 0115283

(51) Int. Cl.
| | | |
|---|---|---|
| G03B 35/08 | (2006.01) | |
| G02B 30/26 | (2020.01) | |
| G06T 7/55 | (2017.01) | |
| G06T 7/521 | (2017.01) | |
| G06T 7/70 | (2017.01) | |

(Continued)

(52) U.S. Cl.
CPC ............ *G03B 35/08* (2013.01); *G01B 11/005* (2013.01); *G02B 30/26* (2020.01); *G03B 17/12* (2013.01); *G03B 17/425* (2013.01); *G06T 7/521* (2017.01); *G06T 7/55* (2017.01); *G06T 7/70* (2017.01);

(Continued)

(58) Field of Classification Search
CPC ...... G03B 35/08; G03B 17/12; G03B 17/425; H04N 5/2253; H04N 5/2254; H04N 5/247; H04N 13/243; H04N 5/225; G06T 7/55; G06T 7/521; G06T 7/70; G01B 11/005;

(Continued)

(56) References Cited

U.S. PATENT DOCUMENTS

| | | | |
|---|---|---|---|
| 9,703,002 B1 * | 7/2017 | Olsson ................. | H01M 2/105 |
| 2014/0368373 A1 * | 12/2014 | Crain ........................ | G01S 5/02 |
| | | | 342/5 |
| 2016/0327383 A1 * | 11/2016 | Becker ................ | G01B 11/005 |

* cited by examiner

*Primary Examiner* — Nasim N Nirjhar
(74) *Attorney, Agent, or Firm* — George G. Wang; Bei & Ocean

(57) ABSTRACT

A three-coordinate mapper, comprising a U-shaped chassis (11) which is formed by successively connecting a front cross-frame, a connecting frame and a rear cross-frame; a square front panel (12); a servo motor (13); a lead screw (14); one ends of four connecting rods (17) are hinged on a periphery of the nut (15); the other end of each of the four connecting rods (17) is hinged to one end of a support rod (18); a driven laser pointer (20) and a left camera (21), a right camera (22), an upper camera (23), and a lower camera (24); an intermediate camera (25) and a driving laser pointer (26); and, a plurality of auxiliary laser pointers (27). The three-coordinate mapper and the mapping method has high measurement precision and fast measurement speed.

6 Claims, 5 Drawing Sheets

(51) Int. Cl.
*G01B 11/00* (2006.01)
*H04N 5/247* (2006.01)
*G03B 17/12* (2006.01)
*G03B 17/42* (2006.01)
*H04N 5/225* (2006.01)

(52) U.S. Cl.
CPC ......... *H04N 5/2253* (2013.01); *H04N 5/2254* (2013.01); *H04N 5/247* (2013.01)

(58) Field of Classification Search
CPC ........ G02B 30/26; G02B 30/40; G02B 13/06; G02B 5/32; G01C 15/002
See application file for complete search history.

THREE-COORDINATE MAPPER AND MAPPING METHOD

TECHNICAL FIELD OF THE INVENTION

The present invention relates to a mapper and in particular to a three-coordinate mapper and a mapping method.

BACKGROUND OF THE INVENTION

Existing mappers include mappers for contact measurement and mappers for non-contact measurement, where:

1. Contact measurement: the mappers for contact measurement can be classified into a trigger type and a continuous type according to different measurement heads, among which three-coordinate measuring machines are used most widely. The three-coordinate measuring machine has high measurement accuracy, and is a large-sized measurement device with large volume, heavy weight, high cost, inability to measure soft objects, low measurement speed and high requirements on environment conditions. Moreover, the three-coordinate measuring machine must be placed horizontally and kept at a constant temperature and humidity.

2. Non-contact measurement: although the scanning speed of the mappers for non-contact measurement is faster than that of the mappers for contact measurement, a certain period of time is still needed. Moreover, the measurement accuracy is low, it is difficult to measure moving objects, or even the scanned character is very different from the real person after it is printed by a 3D printer and does not look like the same person at all.

No matter what kind of the mappers, due to low measurement speed, the measurement efficiency is low and it is unable to measure dynamic objects.

FIG. 1 shows a schematic structure diagram of a mapper in the prior art. A workpiece is placed on a tabletop 1, and a contact 2 comes into contact with a mapping point of the workpiece. At this time, coordinate points of an X-direction support plate 5, a Y-direction support plate 4 and a Z-direction support plate 3 corresponding to the contact 2 are coordinate points of this mapping point of the workpiece. So repeatedly, coordinate points of all mapping points of the workpiece are obtained. This measurement method is performed point by point, so the operation efficiency is low. Moreover, this measurement method can only measure static objects. This measurement method can only measure hard objects, and is difficult to measure soft and flexible objects. The mapper shown in FIG. 1 is large in size, high in cost and difficult to maintain.

SUMMARY OF THE INVENTION

A technical problem to be solved by the present invention is to provide a three-coordinate mapper and a mapping method, with high measurement accuracy and high measurement speed.

The present invention employs the following technical solutions. A three-coordinate mapper is provided, including a chassis, wherein the chassis is a U-shaped frame structure which is formed by successively connecting a front cross-frame, a connecting frame and a rear cross-frame in an end-to-end manner and has an opening on its left side; an end of the front cross-frame is integrally connected with a square front panel arranged vertically; a servo motor is provided at an end of the rear cross-frame; an output shaft of the servo motor is connected to one end of a lead screw, and the other end of the lead screw is connected to a center of a rear surface of the front panel through a bearing; a lead screw is in threaded connection to a nut; one end of each of four connecting rods are hinged at positions, corresponding to four sides of the front panel, on a periphery of the nut; the other end of each of the four connecting rods is hinged to one end of a support rod; the other end of each of the four support rods is correspondingly penetrated through a middle portion of one of the four sides of the front panel; wherein a top end of the support rod penetrated through the left side of the front panel being vertically connected to a bottom surface of a fixed plate, a driven laser pointer and a left camera facing the object to be photographed being provided on the fixed plate, a right camera facing the object to be photographed being provided at a top end of the support penetrated through the right side of the front panel, an upper camera facing the object to be photographed being provided at a top end of the support rod penetrated through the upper side of the front panel, and a lower camera facing the object to be photographed being provided at a top end of the support rod penetrated through the lower side of the front panel; an intermediate camera and a driving laser pointer facing the object to be photographed are provided in a center of a front surface of the front panel; and, a plurality of auxiliary laser pointers facing the object to be photographed are further provided on the front panel in an array manner.

The four support rods respectively penetrated through the four sides of the front panel are hinged to the four sides of the front panel through hinge mechanisms.

The intermediate camera, the left camera, the right camera, the upper camera, the lower camera and the servo motor are connected to a control unit, respectively.

The driving laser pointer is located right below the intermediate camera, the driven laser pointer is located right above the left camera, and the distance from the driven laser pointer to the left camera is equal to the distance from the driving laser pointer to the intermediate camera.

The present invention provides a mapping method for a three-coordinate mapper, including the following steps of:

1) determining a reference distance $H_k$ and a reference included angle $\theta_k$ between a reference plane provided in front of a front panel and the front panel, where k=1 ... M;

2) generating reference spots on the reference plane, the reference spots being all spots on the reference plane projected by auxiliary laser pointers;

3) photographing and storing the reference spots;

4) repeating the step 3) until M sets of the four reference images, the reference distance $H_k$ and the reference included angle $\theta_k$ which are corresponding to each other are obtained, and transmitting them to a control unit for storage;

5) photographing a real object and virtual spots, including:

(1) aligning light beams emitted by a driving laser pointer and a driven laser pointer onto a surface of an object to form two spots, photographing, by an intermediate camera, images of the two spots and transmitting the images to the control unit, driving a servo motor by a main control module in the control unit through a motor driving module, driving four connecting rods to unfold and fold by the servo motor through a lead screw and a nut; driving, by the four connecting rods, four support rods to pass through the front panel to swing about hinge mechanisms, allowing the spot on the surface of the object projected by the driven laser pointer to coincide with the spot on the surface of the object projected by the driving laser pointer so that extension lines of central axes of a left camera, a right camera, a lower camera and an upper camera are allowed to be intersected at the spot, photographing the object simultaneously by the left camera, the right camera, the lower camera and the upper camera to obtain four physical images, and transmitting the physical images to the control unit;

(2) bundling and storing, by the control unit, the four physical images obtained in the step (1), the vertical distance $H_f$ from the spot on the surface of the object projected by the driving laser pointer during photographing to the front panel, and the photographing included angle $\theta_f$ between the light beam of the driven laser pointer and the front panel;

6) determining coordinate points, on four reference images, of a point P on the surface of the object corresponding to the front panel;

7) determining a horizontal coordinate and a vertical coordinate of the point P on the surface of the object;

wherein the horizontal coordinate and the vertical coordinate of the point P are a horizontal coordinate and a vertical coordinate of an auxiliary laser pointer corresponding to the spot on the point P on the front panel;

8) determining a vertical distance Δh from the point P to the reference plane; and 9) repeating the steps 6) to 8) until all coordinate points and vertical distances Δh corresponding to the front panel of the chassis required to draw the images of the object are obtained.

The step 1) further includes the following steps:

(1) activating the driving laser pointer, the intermediate camera, the driven laser pointer, the left camera, the right camera, the lower camera, the upper camera and the auxiliary laser pointers of the mapper;

(2) in front of the front panel, providing a reference plane parallel to the front panel;

(3) photographing, by the intermediate camera, spots on the reference plane respectively projected by the driving laser pointer and the driven laser pointer, transmitting the images to the control unit, driving the servo motor by a main control module in the control unit through a motor driving module, driving four connecting rods to unfold and fold by the servo motor through a lead screw and a nut; driving, by the four connecting rods, four support rods to pass through the front panel to swing about hinge mechanisms, and allowing the spot on the reference plane projected by the driven laser pointer to coincide with the spot on the reference plane projected by the driving laser pointer so that extension lines of central axes of the left camera, the right camera, the lower camera and the upper camera to be intersected on the spot; and (4) setting a vertical distance from the front panel to the spot as a reference distance $H_k$, a reference included angle between the projection of the light beam of the driven laser pointer on XZ and XY coordinate planes as $\theta_k$ and side length of the front panel as L, so that the reference distance $H_k = tg\theta_k \times L/2$.

The step 3) includes the following steps:

photographing the reference spot on the reference plane (e) by the left camera (21), the right camera (22), the lower camera (24) and the upper camera (23) in the photographing direction in the steps (3) of the step 1), to obtain four reference images of the reference spot radiated on reference plane (e) at four different positions, transmitting the four reference images to the main control module of the control unit, and bundling and storing, by the main control module, the four reference images, the reference distance $H_k$ and the reference included angle $\theta_k$.

The mapping method specifically includes:

aligning light beams emitted by the driving laser pointer and the driven laser pointer onto the reference plane to form two spots, photographing, by the intermediate camera, images of the two spots and transmitting the images to the control unit, driving the servo motor by the main control module in the control unit through the motor driving module, driving four connecting rods to unfold and fold by the servo motor through a lead screw and a nut, driving, by the four connecting rods, four support rods to pass through the front panel to swing about hinge mechanisms, swinging the fixed plate to allow the spot on the surface of the reference plane projected by the driven laser pointer to coincide with the spot on the reference plane projected by the driving laser pointer so that extension lines of central axes of the left camera, the right camera, the lower camera and the upper camera are allowed to be intersected at the spot, photographing the reference plane simultaneously by the left camera, the right camera, the lower camera and the upper camera to obtain four reference images, the reference distance $H_k$ and the reference included angle $\theta_k$, and transmitting them to the control unit for storage.

The step 6) includes:

(1) locating position points P1, P2, P3 and P4, on the four physical images, of the point P on the surface of the object;

(2) acquiring the same reference included angle $\theta_k$ as the photographing included angle $\theta_f$, acquiring four reference images corresponding to the reference included angle $\theta_k$, overlapping the reference image photographed by the left camera with the physical image, overlapping the reference image photographed by the right camera with the physical image, overlapping the reference image photographed by the lower camera with the physical image, and overlapping the reference image photographed by the upper camera with the physical image;

(3) determining a projection, on an XZ coordinate plane, of a point on the reference image photographed by the left camera overlapped with the position point P1 on the photographed physical image as a point Q1 on the reference image; determining a projection, on the XZ coordinate plane, of a point on the reference image photographed by the right camera overlapped with the position point P2 on the photographed physical image as a point Q2 on the reference image; determining a projection, on a ZY coordinate plane, of a point on the reference image photographed by the lower camera overlapped with the position point P3 on the photographed physical image as a point Q3 on the reference image; and, determining a projection, on the ZY coordinate plane, of a point on the reference image photographed by the upper camera overlapped with the position point P4 on the photographed physical image as a point Q4 on the reference image; and (4) locating coordinates of the points Q1, Q2, Q3 and Q4 on the front panel.

7) determining a horizontal coordinate and a vertical coordinate of the point P on the surface of the object;

wherein the horizontal coordinate and the vertical coordinate of the point P are a horizontal coordinate and a vertical point of an auxiliary laser pointer, corresponding to the spot radiated on the point P, on the front panel.

The step 8) includes the following steps:

(1) acquiring a distance u from the left camera to the coordinate point of the point Q1 on the front panel, a distance v from the right camera to the coordinate point of the point Q2 on the front panel, a distance w from the lower camera to the coordinate point of the point Q3 on the front panel and a distance r from the upper camera to the coordinate point of the point Q4 on the front panel, respectively;

(2) calculating a distance $h_1$ between the points Q1 and Q2 by the following formula: $h_1=u+v-L$, and calculating a distance $h_2$ between the points Q3 and Q4 by the following formula: $h_2=w+r-L$;

(3) calculating the area $S_{12}$ of a triangle formed by the projections of the points Q1, Q2 and P on the ZX coordinate plane by the following formula: $S_{12}=a1^2 \times \sin B \times \sin C \div 2 \div \sin A = a1^2 \times \sin B \times \sin C \div 2 \div \sin(180-A-B)$, where:

a1 is the base of the triangle, $a1=h_1=u+v-L$, A is an angle subtended by the base of the triangle, B is an included angle between a connecting line of the of the point Q1 with the left camera and the base, and C is an included angle between the a connecting line of the point Q2 with the right camera and the base;

the angle B=arc tgH/u, and the angle C=arc tgH/v; and the angle A=180−B−C=180−arc tgH/u−arc tgH/v;

(4) calculating the area $S_{12}$ of a triangle formed by the points Q1, Q2 and P by the following formula: $S_{12}=a1 \times \Delta h \div 2$, where $\Delta h$ is the height of the triangle;

(5) substituting the formula for calculating the area $S_{12}$ of the triangle in the step 3) into the formula for calculating the area $S_{12}$ of the triangle in the step 4) to obtain $\Delta h1$:

$$a1^2 \times \sin B \times \sin C \div 2 \div \sin A = a1 \times \Delta h1 \div 2,$$

$$\Delta h1 = a1 \times \sin B \times \sin C \div \sin(180-B-C),$$

substituting the angle B=arc tgH/u, the angle C=arc tgH/v, A=180−B−C=180−arc tgH/u−arc tgH/v and a1=u+v−L into the formula for $\Delta h1$ t obtain:

$$\Delta h1=(u+v-L) \times \sin \text{ arc } tgH/u \times \sin \text{ arc } tgH/v \div \sin(180-\text{arc } tgH/u-\text{arc } tgH/v),$$

where $\Delta h1$ is the vertical distance from the point P to the reference plane obtained by the points Q1 and Q2;

(6) calculating the area $S_{34}$ of a triangle formed by the points Q3, Q4 and P by the following formula: $S_{34}=a2^2 \times \sin B2 \times \sin C2 \div 2 \div \sin A2 = a2^2 \times \sin B2 \times \sin C2 \div 2 \div \sin(180-A2-B2)$, where:

a2 is the base of the triangle, $a2=h_2=w+r-L$, A2 is an angle subtended by the base of the triangle, B2 is an included angle between a connecting line of the point Q3 with the lower camera and the base, and C2 is an included angle between a connecting line of the point Q4 with the upper camera and the base;

the angle B2=arc tgH/w, and the angle C2=arc tgH/r; and the angle A2=180−B2−C2=180−arc tgH/w−arc tgH/r;

(7) calculating the area $S_{34}$ of a triangle formed by projections of the points Q3, Q4 and P on the ZY coordinate plane by the following formula: $S_{34}=a2 \times \Delta h2 \div 2$, where $\Delta h2$ is the height of the triangle;

(8) substituting the formula for calculating the area $S_{34}$ of the triangle in the step (6) into the formula for calculating the area $S_{34}$ of the triangle in the step 7) to obtain $\Delta h2$:

$$a2^2 \times \sin B2 \times \sin C2 \div 2 \div \sin A2 = a \times \Delta h2 \div 2,$$

$$\Delta h2=a2 \times \sin B2 \times \sin C2 \div \sin(180-B2-C2),$$

substituting the angle B2=arc tgH/w, the angle C2=arc tgH/r, A2=180−arc tgH/w−arc tgH/r and a2=w+r−L into the formula for $\Delta h2$ to obtain:

$$\Delta h2=(w+r-L) \times \sin \text{ arc } tgH/w \times \sin \text{ arc } tgH/r \div \sin(180-\text{arc } tgH/w-\text{arc } tgH/r),$$

where $\Delta h2$ is the vertical distance from the point P to the reference plane obtained by the points Q3 and Q4;

(9) calculating an arithmetic mean value of the $\Delta h1$ and $\Delta h2$ to obtain the vertical distance $\Delta h$ from the point P to the reference plane;

(10) calculating a depth Z of the point P by the following formula: $Z=H_k \pm \Delta h$; and

(11) deciding whether the $\Delta h$ is positive or negative:
when L−u−v>0, $\Delta h$ is positive,
when L−u−v<0, $\Delta h$ is negative,
when L−r−w>0, $\Delta h$ is positive, and
when L−r−w<0, $\Delta h$ is negative.

The three-coordinate mapper and the mapping method provided by the present invention are high in measurement accuracy and high in measurement speed. The measured points are purely digitalized coordinates without filtering or denoising. Regardless of static or moving objects, by the technology of the present invention, instant collection can be performed at each point on a surface of an object, collection is performed again at a next instant, and the time interval between two times of collection is as small as desired. In this way, an engineering drawing can be automatically drawn by a computer immediately after one collection is completed, and the distance between any two points can be calculated. At a next instant, another engineering drawing can be drawn. Therefore, the change rule of the displacement of each point over time, i.e., the instantaneous speed of this point, can be depicted; and, the change rule of the speed of each point over time, i.e., the instantaneous acceleration of this point, can also be depicted. The present invention has the following advantages.

1. Measurement is performed without contacting the object.

2. The measurement speed is high and the accuracy is high.

3. During photographing, an engineering drawing of an irregular space curved surface shape can be generated and can be dimensioned.

4. The formulae for calculating the distance between two points in the analytic geometry can be used.

5. The mode of the one-to-one correspondence between the mathematical geometry of the conventional space regular curved surface and the function as well as the equation of independent variables has been changed. A mode of one-to-one correspondence between the geometrical shape of the irregular space curved surface and the engineering drawing of the corresponding irregular curved surface is employed in the present invention. That is, the relationship between the function and the independent variable can be expressed in form of the engineering drawing. Therefore, the field of mathematics is expanded.

6. Any irregular curved surface that objectively exists can reveal the relationship between the geometrical shape of the irregular surface posture of any plant, animal and mineral and the function and independent variable thereof by means of the engineering drawing of the present invention. The present invention is high in applicability and simple in operation, and can easily obtain mathematical models. Since the curved surface is irregular but continuous, the curved surface is described by a "point cloud" (point to point, uninterrupted), so that the irregularity of the curved surface is adapted.

7. The three-dimensional object surrounded by the "point cloud" data in the engineering drawing of the present invention is printed by a 3D printer and will look like a real object. The volume of the irregular object can be easily measured accurately by a liquid discharge method, so that various physical quantities such as density, mass and weight can be obtained.

8. With the progress of technology, the clearance c between auxiliary laser pointers is manufactured as small as possible, that is, Δx→0 and Δy→0, so that partial differentiation or full differentiation can be performed for this irregular curved surface.

9. If a dynamic irregular curved surface is photographed by a high-speed photographing technology, the time interval between two pictures of two frames will become smaller and smaller, that is, Δt→0. For any point on any dynamic irregular curved surface, the instantaneous speed or even instantaneous acceleration of any point on the dynamic irregular curved surface can be calculated with respect to time.

10. The engineering design is simplified, and the automatic manufacturing efficiency is improved.

11. The present application can be applied to various fields such as robots, animation, CVR, geological mapping and mechanical drawing.

BRIEF DESCRIPTION OF THE DRAWINGS

FIG. 9 is a left view of FIG. 7;
in which:

| 1: tabletop | 2: contact |
| --- | --- |
| 3: Z-direction support plate | 4: Y-direction support plate |
| 5: X-direction support plate | 6: chassis |
| 10: spot | 11: chassis |
| 12: front panel | 13: servo motor |
| 14: lead screw | 15: nut |
| 16: bearing | 17: connecting rod |
| 18: support rod | 19: fixed plate |
| 20: driven laser pointer | 21: left camera |
| 22: right camera | 23: upper camera |
| 24: lower camera | 25: intermediate camera |
| 26: driving laser pointer | 27: auxiliary laser pointer |
| 28: hinge structure | 29: object |
| 30: spot | |

DETAILED DESCRIPTION OF THE INVENTION

The three-coordinate mapper and the mapping method of the present invention will be described below in detail by embodiments with reference to the accompanying drawings.

Figure 1:
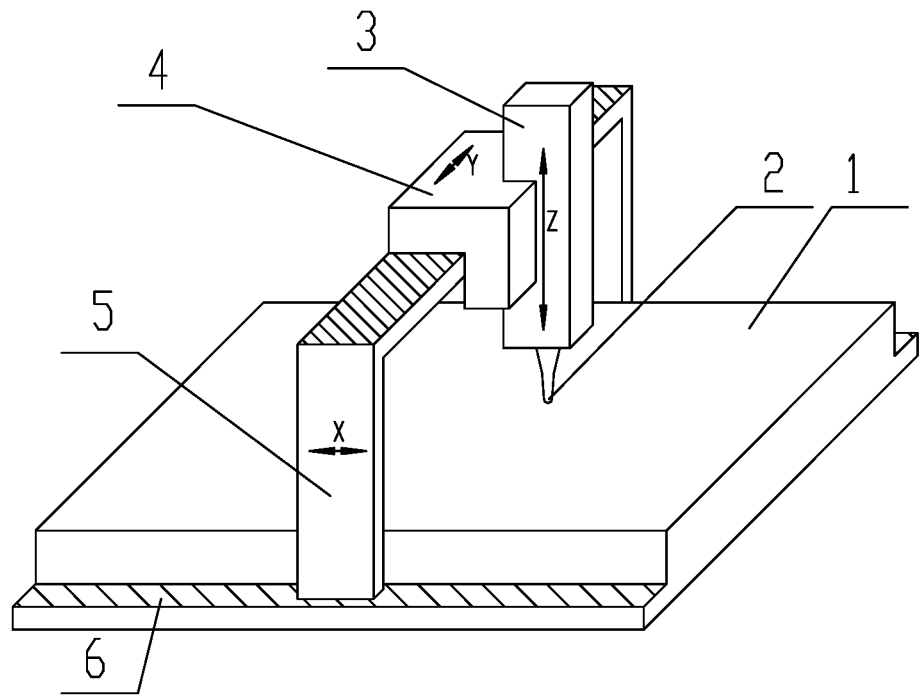
FIG. 1 is a schematic structure diagram of a mapper in the prior art.
Figure 2:
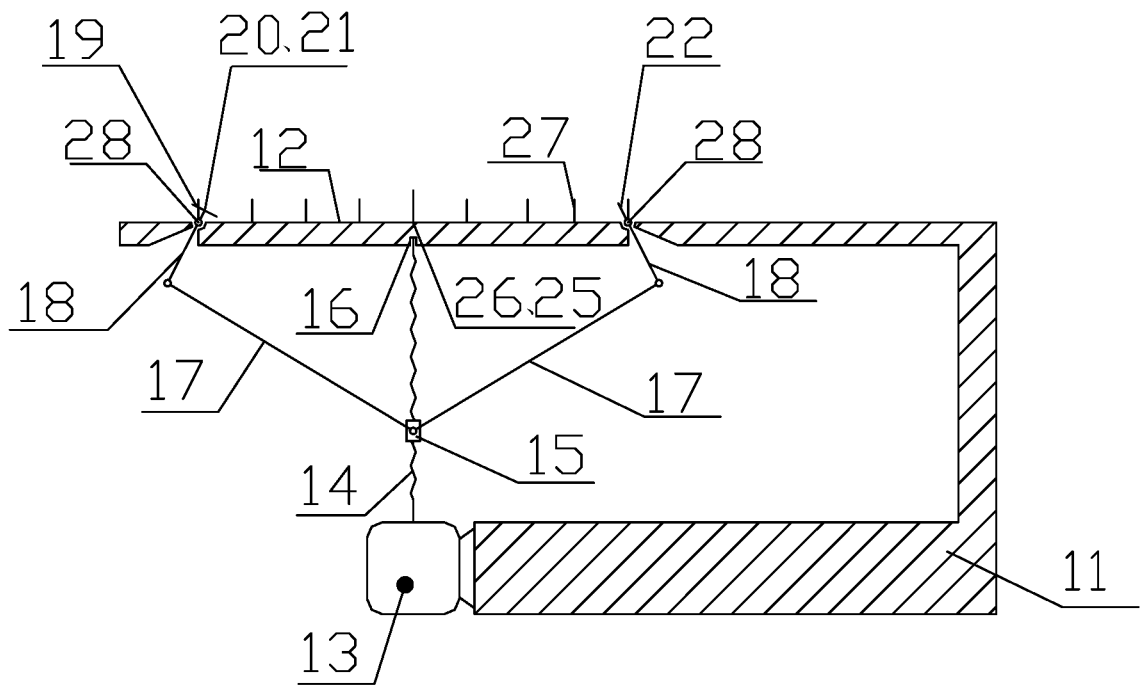
FIG. 2 is a schematic structure diagram of a three-coordinate mapper according to the present invention, when viewed from the top.
Figure 3:
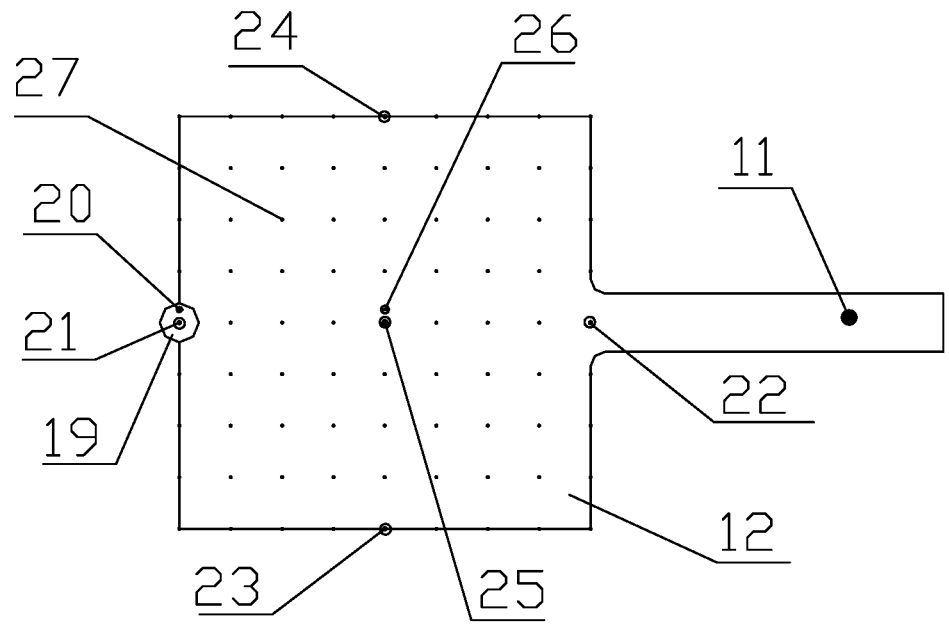
FIG. 3 is a top view of FIG. 2.
Figure 4:
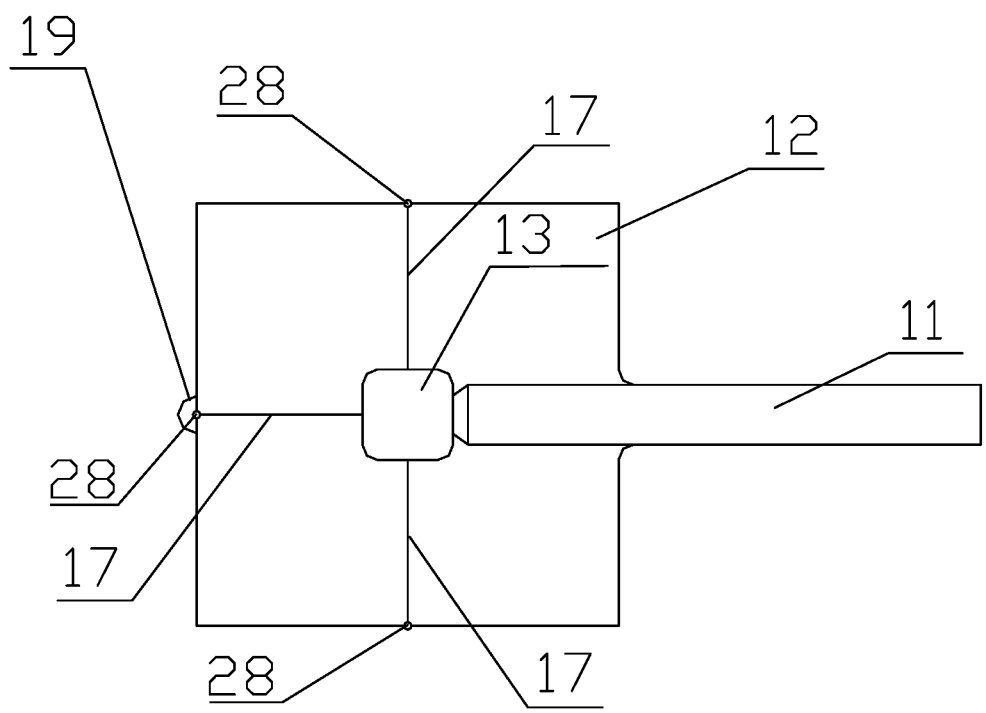
FIG. 4 is a bottom view of FIG. 2.

As shown in FIGS. 1, 2, 3 and 4, the present invention provides a three-coordinate mapper, including a chassis 11. The chassis 11 is a U-shaped frame structure which is formed by successively connecting a front cross-frame, a connecting frame and a rear cross-frame in an end-to-end manner and has an opening on its left side. An end of the front cross-frame is integrally connected with a square front panel 12 arranged vertically. A servo motor 13 is provided at an end of the rear cross-frame. An output shaft of the servo motor 13 is connected to one end of a lead screw 14, and the other end of the lead screw 14 is connected to a center of a rear surface of the front panel 12 through a bearing 16. A lead screw 14 is in threaded connection to a nut 15. One ends of four connecting rods 17 are hinged at positions, corresponding to four sides of the front panel 12, on a periphery of the nut 15. The other end of each of the four connecting rods 17 is hinged to one end of a support rod 18. The other end of each of the four support rods 18 is correspondingly penetrated through a middle portion of one of the four sides of the front panel 12, wherein a top end of the support rod 18 penetrated through the left side of the front panel 12 is vertically connected to a bottom surface of a fixed plate 19, a driven laser pointer 20 and a left camera 21 facing the object to be photographed are provided on the fixed plate 19, a right camera 22 facing the object to be photographed is provided at a top end of the support 18 penetrated through the right side of the front panel 12, an upper camera 23 facing the object to be photographed is provided at a top end of the support rod 18 penetrated through the upper side of the front panel 12, and a lower camera 24 facing the object to be photographed is provided at a top end of the support rod 18 penetrated through the lower side of the front panel 12. An intermediate camera 25 and a driving laser pointer 26 facing the object to be photographed are provided in a center of a front surface of the front panel 12. A plurality of auxiliary laser pointers 27 facing the object to be photographed are further provided on the front panel 12 in an array manner. The light beams emitted by the plurality of auxiliary laser pointers 27 are different in size.

The intermediate camera 25, the left camera 21, the right camera 22, the upper camera 23, the lower camera 24 and the servo motor 13 are connected to a control unit, respectively.

The overall control portion and the power supply portion of the three-coordinate mapper of the present invention employ the technical solutions disclosed in the Patent No. 201420592944.8 entitled "REMOTE CONTROL DEVICE FOR DOLLY BASED ON LASER GUIDANCE".

In the three-coordinate mapper of the present invention, all the driving laser pointer 26, the intermediate camera 25 and the plurality of auxiliary laser pointers 27 that are arranged in an array with n equidistant rows and n equidistant columns are perpendicular to the front panel 12. The front panel 12 is a square having the length of side of L. The intermediate camera 25 is arranged in the center, and the driving laser pointer 26 is located right below the intermediate camera 25. The left camera 21 is mounted on the fixed plate 19 and located at an intersection of a left edge of the front panel 12 with an x-axis. The driven laser pointer 20 is also mounted on the fixed plate 19 and located right below the left camera 21. The distance from the driven laser pointer 20 to the left camera 21 is equal to the distance from the driving laser pointer 26 to the intermediate camera 25. The fixed pate 19 is integrally formed with a left support rod 18 that can swing. The right camera 22 is mounted on a support rod 18 that can swing at the intersection of the right edge of the front panel 12 with the x-axis. The upper camera 23 is mounted on a support rod 18 that can swing at an intersection of a right edge of the tabletop of the chassis with a y-axis. The lower camera 24 is mounted at a support rod 18 that can swing at an intersection of the right edge of the front panel 12 with the y-axis.

Figure 5:
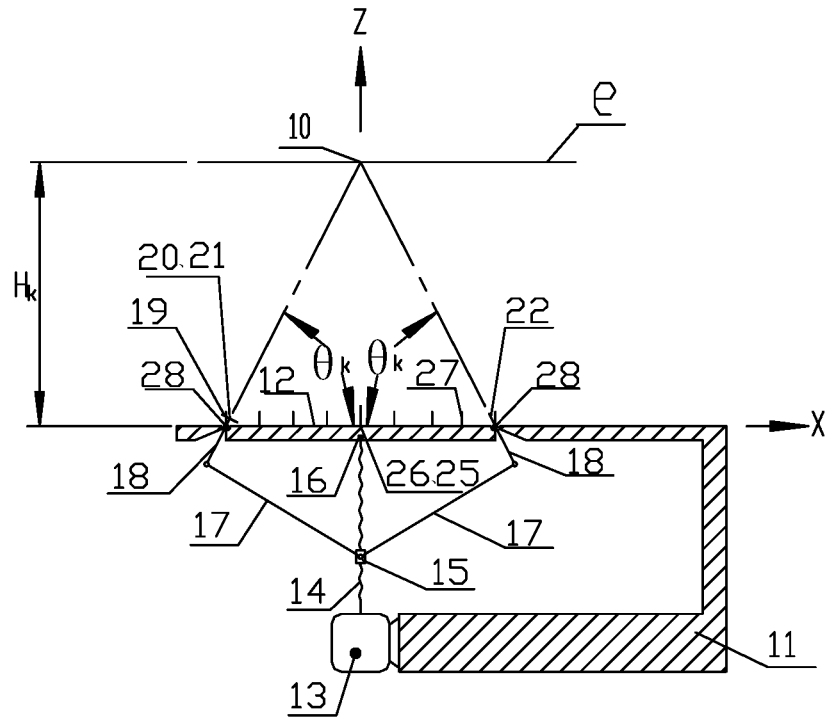
FIG. 5 is a schematic structure diagram of a plane e determined by the three-coordinate mapper according to the present invention.
Figure 6:
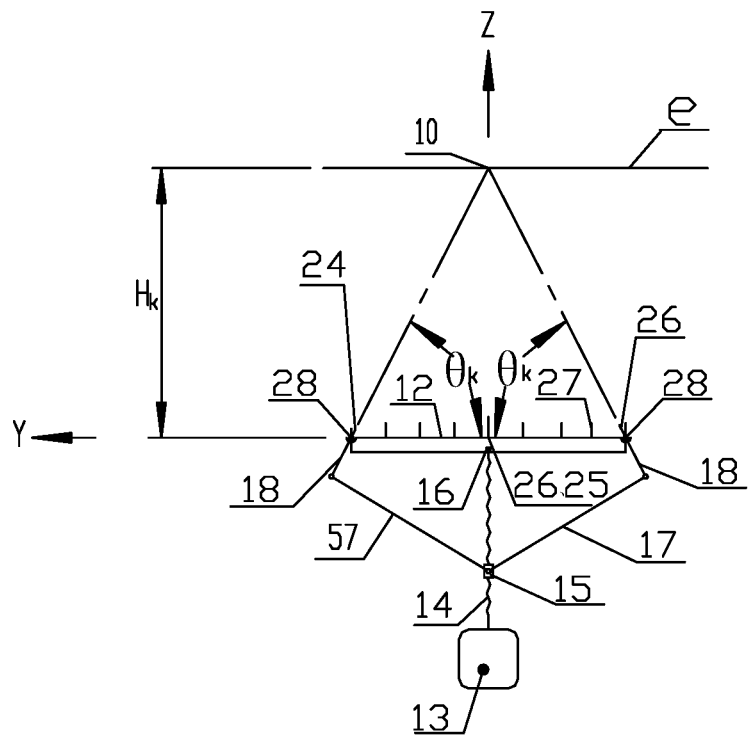
FIG. 6 is a left view of a front panel portion in FIG. 5.
Figure 7:
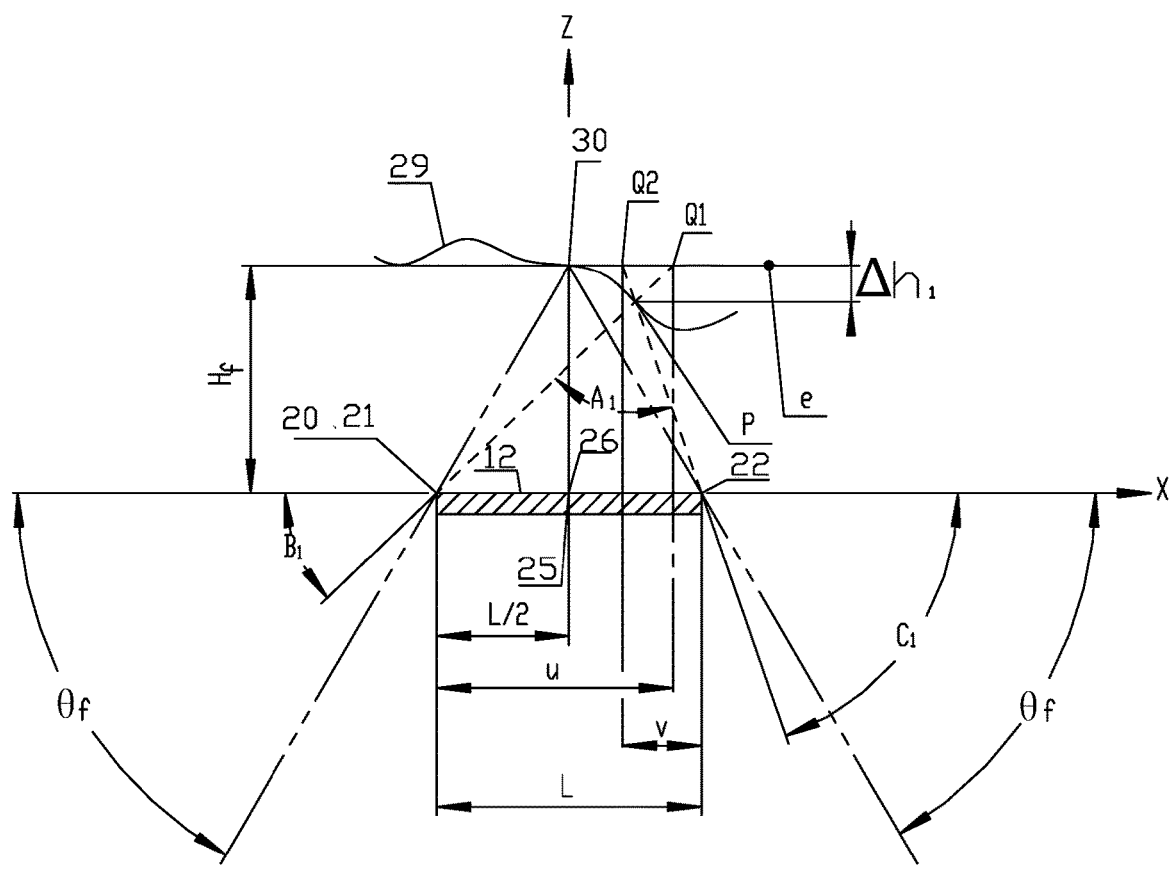
FIG. 7 is a schematic diagram of the actual measurement of the three-coordinate mapper according to the present invention.
Figure 8:
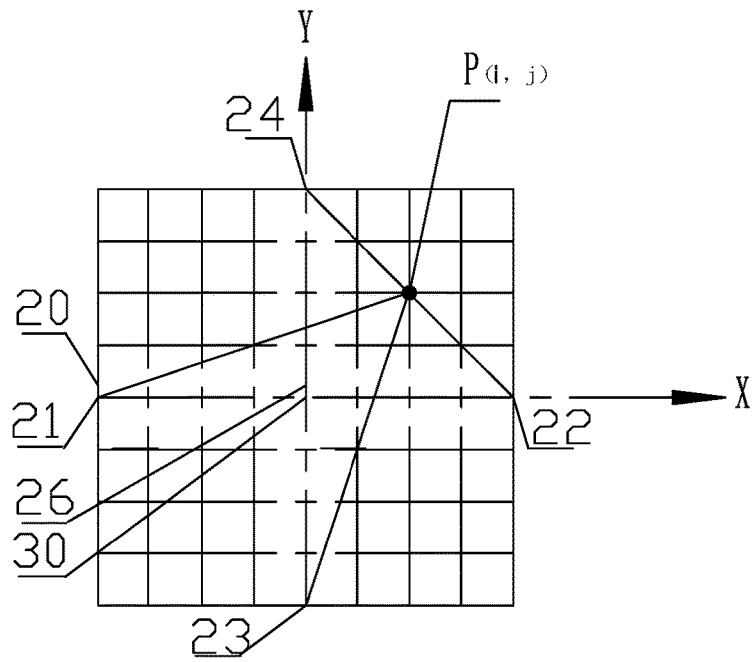
FIG. 8 is a top view of FIG. 7.
Figure 9:
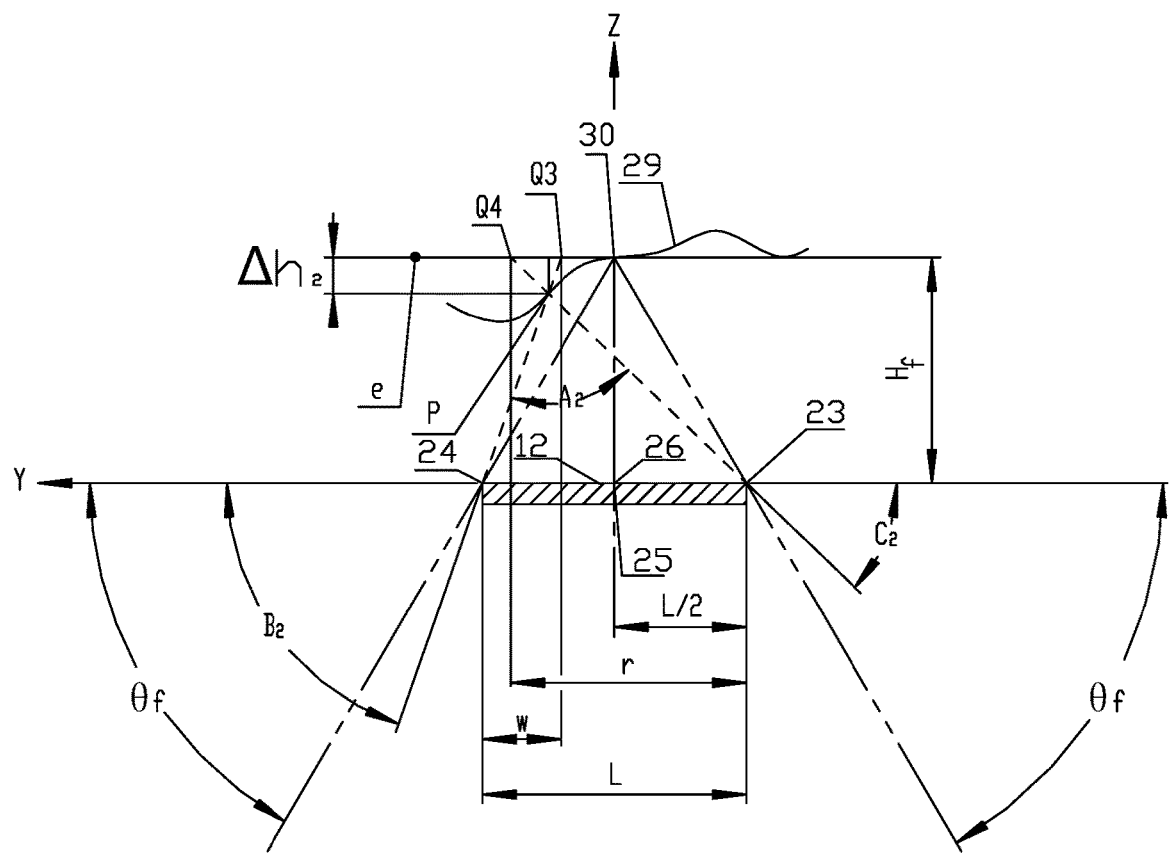

As shown in FIGS. 5 to 9, the present invention provides a mapping method for a three-coordinate mapper, including the following steps.

1) A reference distance $H_k$ and a reference included angle $\theta_k$ between a reference plane e provided in front of the front panel 12 and the front panel 12 are determined, where k=1 . . . M, including:

(1) The driving laser pointer 26, the intermediate camera 25, the driven laser pointer 20, the left camera 21, the right camera 22, the lower camera 24, the upper camera 23 and the auxiliary laser pointers 27 of the mapper are activated.

(2) In front of the front panel 12, a reference plane e parallel to the front panel 12 is provided.

(3) Spots respectively radiated on the reference plane e by the driving laser pointer 26 and the driven laser pointer 20 are photographed by the intermediate camera 25, and the images are transmitted to the control unit; the main control module in the control unit drives the servo motor 13 through a motor driving module; the servo motor 13 drives four connecting rods 17 to unfold and fold through a lead screw 14 and a nut 15; the four connecting rods 17 drive four support rods 18 to pass through the front panel 12 to swing about hinge mechanisms 28; and the spot radiated on the reference plane e by the driven laser pointer 20 is allowed to coincide with the spot 10 radiated on the reference plane e by the driving laser pointer 26 so that extension lines of central axes of the left camera 21, the right camera 22, the lower camera 24 and the upper camera 23 to be intersected on the spot 10.

(4) A vertical distance from the front panel 12 to the spot 10 is set as a reference distance $H_k$, a reference included angle between the projections of the light beam of the driven laser pointer 20 on XZ and XY coordinate planes is set as $\theta_k$ and the side length of the front panel 12 is set as L, so that the reference distance $H_k = tg\theta_k \times L/2$.

2) Reference spots are generated on the reference plane e, wherein the reference spots are all spots radiated on the reference plane e by the auxiliary laser pointers 27.

3) The reference spots are photographed and stored, including:

the reference spot on the reference plane e are photographed by the left camera 21, the right camera 22, the lower camera 24 and the upper camera 23 in the four photographing direction in the steps (3) of the step 1), to obtain four reference images of the reference spot radiated on reference plane e at different positions, the four reference images are transmitted to the main control module of the control unit, and the main control module bundles and stores the four reference images, the reference distance $H_k$ and the reference included angle $\theta_k$. Specifically:

Light beams emitted by the driving laser pointer 26 and the driven laser pointer 20 are aligned onto the reference plane e to form two spots; the intermediate camera 25 photographs images of the two spots and transmits the images to the control unit; the main control module in the control unit drives the servo motor 13 through the motor driving module; the servo motor 13 drives four connecting rods 17 to unfold and fold through a lead screw 14 and a nut 15; the four connecting rods 17 drive four support rods 18 to pass through the front panel 12 to swing about hinge mechanisms 28; the swing of the fixed plate 19 allows the spot radiated on the surface of the reference plane e by the driven laser pointer 20 to coincide with the spot 30 radiated on the reference plane e by the driving laser pointer 26 so that extension lines of central axes of the left camera 21, the right camera 22, the lower camera 24 and the upper camera 23 are allowed to be intersected at the spot 10; and, the reference plane e is simultaneously photographed by the left camera 21, the right camera 22, the lower camera 24 and the upper camera 23 to obtain four reference images, the reference distance $H_k$ and the reference included angle $\theta_k$, and the four reference images, the reference distance $H_k$ and the reference included angle $\theta_k$ are transmitted to the control unit for storage.

4) The step 3) is repeated until M sets of the four reference images, the reference distance $H_k$ and the reference included angle $\theta_k$ which are corresponding to each other are obtained, and the four reference images, the reference distance $H_k$ and the reference included angle $\theta_k$ are transmitted to the control unit for storage.

5) A real object and virtual spots are photographed, including:

(1) Light beams emitted by the driving laser pointer 26 and the driven laser pointer 20 are aligned onto a surface of an object 29 to form two spots; the intermediate camera 25 photographs images of the two spots and transmits the images to the control unit; the main control module in the control unit drives the servo motor 13 through a motor driving module; the servo motor 13 drives four connecting rods 17 to unfold and fold through a lead screw 14 and a nut 15; the four connecting rods 17 drive four support rods 18 to pass through the front panel 12 to swing about hinge mechanisms 28; the spot radiated on the surface of the object 29 by the driven laser pointer (20) is allowed to coincide with the spot 30 radiated on the surface of the object 29 by the driving laser pointer 26 so that extension lines of central axes of the left camera 21, the right camera 22, the lower camera 24 and the upper camera 23 are allowed to be intersected at the spot 30; and, the object 29 is simultaneously photographed by the left camera 21, the right camera 22, the lower camera 24 and the upper camera 23 to obtain four physical images, and the physical images are transmitted to the control unit.

(2) The control unit bundles and stores the four physical images obtained in the step (1), the vertical distance $H_f$ from the spot radiated on the surface of the object 29 by the driving laser pointer 26 during photographing to the front panel 12, and the photographing included angle $\theta_f$ between the light beam of the driven laser pointer 20 and the front panel 12.

6) Coordinate points, on four reference images, of a point P on the surface of the object 29 corresponding to the front panel 12 are determined, including:

(1) Position points P1, P2, P3 and P4, on the four physical images, of the point P on the surface of the object (29) are located.

(2) The same reference included angle $\theta_k$ as the photographing included angle $\theta_f$ is acquired; four reference images corresponding to the reference included angle $\theta_k$ are acquired; the reference image photographed by the left camera 21 is overlapped with the photographed physical image; the reference image photographed by the right camera 22 is overlapped with the photographed physical image; the reference image photographed by the lower camera 24 is overlapped with the photographed physical image; and the reference image photographed by the upper camera 23 is overlapped with the photographed physical image.

(3) A projection, on an XZ coordinate plane, of a point on the reference image photographed by the left camera 21 overlapped with the position point P1 on the photographed physical image is determined as a point Q1 on the reference image; a projection, on the XZ coordinate plane, of a point on the reference image photographed by the right camera 22 overlapped with the position point P2 on the photographed physical image is determined as a point Q2 on the reference image; a projection, on a ZY coordinate plane, of a point on the reference image photographed by the lower camera 24 overlapped with the position point P3 on the photographed physical image is determined as a point Q3 on the reference image; and, a projection, on the ZY coordinate plane, of a point on the reference image photographed by the upper camera 23 overlapped with the position point P4 on the photographed physical image is determined as a point Q4 on the reference image.

(4) Coordinate points of the points Q1, Q2, Q3 and Q4 on the front panel 12 are located.

7) A horizontal coordinate and a vertical coordinate of the point P on the surface of the object 29 are determined.

The horizontal coordinate and the vertical coordinate of the point P are a horizontal coordinate and a vertical point of an auxiliary laser pointer, corresponding to the spot radiated on the point P, on the front panel 12.

8) A vertical distance $\Delta h$ from the point P to the reference plane e is determined, including:

(1) A distance u from the left camera 21 to the coordinate point of the point Q1 on the front panel 12, a distance v from the right camera 22 to the coordinate point of the point Q2 on the front panel 12, a distance w from the lower camera 24 to the coordinate point of the point Q3 on the front panel 12 and a distance r from the upper camera 23 to the coordinate point of the point Q4 on the front panel 12 are acquired, respectively.

(2) A distance $h_1$ between the points Q1 and Q2 is calculated by the following formula: $h_1=u+v-L$, and a distance $h_2$ between the points Q3 and Q4 is calculated by the following formula: $h_2=w+r-L$.

(3) The area $S_{12}$ of a triangle formed by the projections of the points Q1, Q2 and P on the ZX coordinate plane is calculated by the following formula: $S_{12}=a1^2 \times \sin B \times \sin C \div 2 \div \sin A = a1^2 \times \sin B \times \sin C \div 2 \div \sin(180-A-B)$, where:

a1 is the base of the triangle, $a1=h_1=u+v-L$, A is an angle subtended by the base of the triangle, B is an included angle between a connecting line of the of the point Q1 with the left camera (21) and the base, and C is an included angle between the a connecting line of the point Q2 with the right camera (22) and the base;

the angle B=arc tgH/u, and the angle C=arc tgH/v; and the angle A=180−B−C=180−arc tgH/u−arc tgH/v.

(4) The area $S_{12}$ of a triangle formed by the points Q1, Q2 and P is calculated by the following formula: $S_{12}=a1 \times \Delta h \div 2$, where $\Delta h$ is the height of the triangle.

(5) The formula for calculating the area $S_{12}$ of the triangle in the step 3) is substituted into the formula for calculating the area $S_{12}$ of the triangle in the step 4) to obtain $\Delta h1$:

$$a1^2 \times \sin B \times \sin C \div 2 \div \sin A = a1 \times \Delta h1 \div 2,$$

$$\Delta h1 = a1 \times \sin B \times \sin C \div \sin(180-B-C).$$

The angle B=arc tgH/u, the angle C=arc tgH/v, A=180−B−C=180−arc tgH/u−arc tgH/v and a1=u+v−L are substituted into the formula for $\Delta h1$:

$$\Delta h1=(u+v-L) \times \sin \text{ arc } tgH/u \times \sin \text{ arc } tgH/v \div \sin(180-\text{arc } tgH/u-\text{arc } tgH/v),$$

where $\Delta h1$ is the vertical distance from the point P to the reference plane e obtained by the points Q1 and Q2.

(6) The area $S_{34}$ of a triangle formed by the points Q3, Q4 and P is calculated by the following formula: $S_{34}=a2^2 \times \sin B2 \times \sin C2 \div 2 \div \sin A2 = a2^2 \times \sin B2 \times \sin C2 \div 2 \div \sin(180-A2-B2)$, where:

a2 is the base of the triangle, $a2=h_2=w+r-L$, A2 is an angle subtended by the base of the triangle, B2 is an included angle between a connecting line of the point Q3 with the lower camera (24) and the base, and C2 is an included angle between a connecting line of the point Q4 with the upper camera (23) and the base;

the angle B2=arc tgH/w, and the angle C2=arc tgH/r; and the angle A2=180−B2−C2=180−arc tgH/w−arc tgH/r.

(7) The area $S_{34}$ of a triangle formed by projections of the points Q3, Q4 and P on the ZY coordinate plane is calculated by the following formula: $S_{34}=a2 \times \Delta h2 \div 2$, where $\Delta h2$ is the height of the triangle.

(8) The formula for calculating the area $S_{34}$ of the triangle in the step 6) into the formula for calculating the area $S_{34}$ of the triangle in the step 7) to obtain $\Delta h2$:

$$a2^2 \times \sin B2 \times \sin C2 \div 2 \div \sin A2 = a \times \Delta h2 \div 2,$$

$$\Delta h2 = a2 \times \sin B2 \times \sin C2 \div \sin(180-B2-C2),$$

substituting the angle B2=arc tgH/w, the angle C2=arc tgH/r, A2=180−arc tgH/w−arc tgH/r and a2=w+r−L into the formula for $\Delta h2$:

$$\Delta h2=(w+r-L) \times \sin \text{ arc } tgH/w \times \sin \text{ arc } tgH/r \div \sin(180-\text{arc } tgH/w-\text{arc } tgH/r),$$

where $\Delta h2$ is the vertical distance from the point P to the reference plane e obtained by the points Q3 and Q4.

(9) An arithmetic mean value of the $\Delta h1$ and $\Delta h2$ is calculated to obtain the vertical distance $\Delta h$ from the point P to the reference plane e.

(10) A depth Z of the point P is calculated by the following formula: $Z=H_k \pm \Delta h$.

(11) It is decided whether the $\Delta h$ is positive or negative:
when L−u−v>0, $\Delta h$ is positive,
when L−u−v<0, $\Delta h$ is negative,
when L−r−w>0, $\Delta h$ is positive, and
when L−r−w<0, $\Delta h$ is negative.

9) The steps 6) to 8) are repeated until all coordinate points and vertical distances $\Delta h$ corresponding to the front panel 12 of the chassis required to draw the images of the object 29 are obtained.

The invention claimed is:

1. A mapping method for a three-coordinate mapper that comprises a chassis, wherein the chassis is a U-shaped frame structure which is formed by successively connecting a front cross-frame, a connecting frame and a rear cross-frame in an end-to-end manner and has an opening on its left side; an end of the front cross-frame is integrally connected with a square front panel arranged vertically; a servo motor is provided at an end of the rear cross-frame; an output shaft of the servo motor is connected to one end of a lead screw, and the other end of the lead screw is connected to a center of a rear surface of the front panel through a bearing; a lead screw is in threaded connection to a nut; one ends of four connecting rods are hinged at positions, corresponding to four sides of the front panel, on a periphery of the nut; the other end of each of the four connecting rods is hinged to one end of a support rod; the other end of each of the four support rods is correspondingly penetrated through a middle portion of one of the four sides of the front panel, with a top end of the support rod penetrated through the left side of the front panel being vertically connected to a bottom surface of a fixed plate, a driven laser pointer and a left camera facing an object to be photographed being provided on the fixed plate, a right camera facing the object to be photographed being provided at a top end of the support penetrated through the right side of the front panel, an upper camera facing the object to be photographed being provided at a top end of the support rod penetrated through the upper side of the front panel, and a lower camera facing the object to be photographed being provided at a top end of the support rod penetrated through the lower side of the front panel; an intermediate camera and a driving laser pointer facing the object to be photographed are provided in a center of a front surface of the front panel; and, a plurality of auxiliary laser pointers facing the object to be photographed are further provided on the front panel in an array manner, comprising the following steps of:

1) determining a reference distance $H_k$ and a reference included angle $\theta_k$ between a reference plane (e) provided in front of a front panel and the front panel, where k=1 . . . M, and M is a number;
2) generating reference spots on the reference plane (e), the reference spots being all spots radiated on the reference plane (e) by auxiliary laser pointers;
3) photographing and storing the reference spots in four reference images;
4) repeating the step 3) M times, wherein each time the four reference images, the reference distance $H_k$ and the reference included angle $\theta_k$ which are corresponding to each other are obtained, and are transmitted to a control unit for storage;
5) photographing a real object and virtual spots, comprising:
    (1) aligning light beams emitted by a driving laser pointer and a driven laser pointer onto a surface of an object to form two spots, photographing, by an intermediate camera, images of the two spots and transmitting the images to the control unit, driving a servo motor by a main control module in the control unit through a motor driving module, driving four connecting rods to unfold and fold by the servo motor through a lead screw and a nut, driving, by the four connecting rods, four support rods to pass through the front panel to swing about hinge mechanisms, allowing the spot on the surface of the object projected by the driven laser pointer to coincide with the spot on the surface of the object projected by the driving laser pointer so that extension lines of central axes of a left camera, a right camera, a lower camera and an upper camera are allowed to be intersected at the spot, photographing the object simultaneously by the left camera, the right camera, the lower camera and the upper camera to obtain four physical images, and transmitting the physical images to the control unit;
    (2) bundling and storing, by the control unit, the four physical images obtained in the step (1), a vertical distance $H_f$ from the spot on the surface of the object projected by the driving laser pointer during photographing to the front panel, and a photographing included angle $\theta_f$ between the light beam of the driven laser pointer and the front panel;
6) determining coordinate points, on four reference images, of a point P on the surface of the object corresponding to the front panel;
7) determining a horizontal coordinate and a vertical coordinate of the point P on the surface of the object; wherein the horizontal coordinate and the vertical coordinate of the point P are a horizontal coordinate and a vertical point of an auxiliary laser pointer, corresponding to the spot radiated on the point P, on the front panel;
8) determining a vertical distance $\Delta h$ from the point P to the reference plane (e); and
9) repeating the steps 6) to 8) until all coordinate points and vertical distances $\Delta h$ corresponding to the front panel of the chassis required to draw the images of the object are obtained.

2. The mapping method for a three-coordinate mapper according to claim 1, wherein the step 1) comprises:
    (1) activating the driving laser pointer, the intermediate camera, the driven laser pointer, the left camera, the right camera, the lower camera, the upper camera and the auxiliary laser pointers of the mapper;
    (2) in front of the front panel, providing a reference plane (e) parallel to the front panel;
    (3) photographing, by the intermediate camera, spots respectively radiated on the reference plane (e) by the driving laser pointer and the driven laser pointer, transmitting the images to the control unit, driving the servo motor by a main control module in the control unit through a motor driving module, driving four connecting rods to unfold and fold by the servo motor through a lead screw and a nut; driving, by the four connecting rods, four support rods to pass through the front panel to swing about hinge mechanisms, and allowing the spot radiated on the reference plane (e) by the driven laser pointer to coincide with the spot radiated on the reference plane (e) by the driving laser pointer so that extension lines of central axes of the left camera, the right camera, the lower camera and the upper camera to be intersected on the spot; and
    (4) setting a vertical distance from the front panel to the spot as a reference distance $H_k$, a reference included angle between the projection of the light beam of the driven laser pointer on XZ and XY coordinate planes as θk and the side length of the front panel as L, so that the reference distance $H_k = \text{tg}\theta_k \times L/2$.

3. The mapping method for a three-coordinate mapper according to claim 1, wherein the step 3) comprises: photographing the reference spot on the reference plane (e) by the left camera, the right camera, the lower camera and the upper camera in the four photographing direction in the steps (3) of the step 1), to obtain four reference images of the reference spot radiated on reference plane (e) at different positions, transmitting the four reference images to the main control module of the control unit, and bundling and storing, by the main control module, the four reference images, the reference distance $H_k$ and the reference included angle $\theta_k$.

4. The mapping method for a three-coordinate mapper according to claim 3, specifically comprising: aligning light beams emitted by the driving laser pointer and the driven laser pointer onto the reference plane (e) to form two spots, photographing, by the intermediate camera, images of the two spots and transmitting the images to the control unit, driving the servo motor by the main control module in the control unit through the motor driving module, driving four connecting rods to unfold and fold by the servo motor through a lead screw and a nut, driving, by the four connecting rods, four support rods to pass through the front panel to swing about hinge mechanisms, swinging the fixed plate to allow the spot on the surface of the reference plane (e) projected by the driven laser pointer to coincide with the spot radiated on the reference plane (e) by the driving laser pointer so that extension lines of central axes of the left camera, the right camera, the lower camera and the upper camera are allowed to be intersected at the spot, photographing the reference plane (e) simultaneously by the left camera, the right camera, the lower camera and the upper camera to obtain four reference images, the reference distance $H_k$ and the reference included angle $\theta_k$, and transmitting them to the control unit for storage.

5. The mapping method for a three-coordinate mapper according to claim 1, wherein the step 6) comprises:
   (1) locating position points P1, P2, P3 and P4, on the four physical images, of the point P on the surface of the object;
   (2) acquiring the same reference included angle $\theta_k$ as the photographing included angle $\theta f$, acquiring four reference images corresponding to the reference included angle $\theta_k$, overlapping the reference image photographed by the left camera with the photographed physical image, overlapping the reference image photographed by the right camera with the photographed physical image, overlapping the reference image photographed by the lower camera with the photographed physical image, and overlapping the reference image photographed by the upper camera with the photographed physical image;
   (3) determining a projection, on an XZ coordinate plane, of a point on the reference image photographed by the left camera overlapped with the position point P1 on the photographed physical image as a point Q1 on the reference image; determining a projection, on the XZ coordinate plane, of a point on the reference image photographed by the right camera overlapped with the position point P2 on the photographed physical image as a point Q2 on the reference image; determining a projection, on a ZY coordinate plane, of a point on the reference image photographed by the lower camera overlapped with the position point P3 on the photographed physical image as a point Q3 on the reference image; and, determining a projection, on the ZY coordinate plane, of a point on the reference image photographed by the upper camera overlapped with the position point P4 on the photographed physical image as a point Q4 on the reference image; and
   (4) locating coordinate points of the points Q1, Q2, Q3 and Q4 on the front panel.

6. The mapping method for a three-coordinate mapper according to claim 1, wherein the step 8) comprises:
   (1) acquiring a distance u from the left camera to the coordinate point of the point Q1 on the front panel, a distance v from the right camera to the coordinate point of the point Q2 on the front panel, a distance w from the lower camera to the coordinate point of the point Q3 on the front panel and a distance r from the upper camera to the coordinate point of the point Q4 on the front panel, respectively;
   (2) calculating a distance h1 between the points Q1 and Q2 by the following formula: $h_1 = u+v-L$, and calculating a distance $h_2$ between the points Q3 and Q4 by the following formula: $h_2 = w+r-L$;
   (3) calculating the area $S_{12}$ of a triangle formed by the projections of the points Q1, Q2 and P on the ZX coordinate plane by the following formula: $S_{12} = a1^2 \times \sin B \times \sin C \div 2 \div \sin A = a1^2 \times \sin B \times \sin C \div 2 \div \sin(180-A-B)$, where:
   a1 is the base of the triangle, $a1 = h1 = u+v-L$, A is an angle subtended by the base of the triangle, B is an included angle between a connecting line of the of the point Q1 with the left camera and the base, and C is an included angle between the a connecting line of the point Q2 with the right camera and the base; the angle B=arc tgH/u, and the angle C=arc tgH/v; and the angle A=180−B−C=180−arc tgH/u−arc tgH/v;
   (4) calculating the area $S_{12}$ of a triangle formed by the points Q1, Q2 and P by the following formula: $S_{12} = a1 \times \Delta h \div 2$, where $\Delta h$ is the height of the triangle;
   (5) substituting the formula for calculating the area $S_{12}$ of the triangle in the step 3) into the formula for calculating the area $S_{12}$ of the triangle in the step 4) to obtain $\Delta h1$:

$a1^2 \times \sin B \times \sin C \div 2 \div \sin A = a1 \times \Delta h1 \div 2$, $\Delta h1 = a1 \times \sin B \times \sin C \div \sin(180-B-C)$, substituting the angle B=arc tgH/u, the angle C=arc tgH/v, A=180−B−C=180−arc tgH/u−arc tgH/v and $a1=u+v-L$ into the formula for $\Delta h1$:

$\Delta h1 = (u+v-L) \times \sin\text{ arc } tgH/u \times \sin\text{ arc } tgH/v \div \sin(180-\text{arc } tgH/u-\text{arc } tgH/v)$, where $\Delta h1$ is the vertical distance from the point P to the reference plane (e) obtained by the points Q1 and Q2;
   (6) calculating the area $S_{34}$ of a triangle formed by the points Q3, Q4 and P by the following formula: $S_{34} = a2^2 \times \sin B2 \times \sin C2 \div 2 \div \sin A2 = a2^2 \times \sin B2 \times \sin C2 \div 2 \div \sin(180-A2-B2)$, where:
   a2 is the base of the triangle, $a2 = h_2 = w+r-L$, A2 is an angle subtended by the base of the triangle, B2 is an included angle between a connecting line of the point Q3 with the lower camera and the base, and C2 is an included angle between a connecting line of the point Q4 with the upper camera and the base;
   the angle B2=arc tgH/w, and the angle C2=arc tgH/r; and the angle A2=180−B2−C2=180−arc tgH/w−arc tgH/r;
   (7) calculating the area $S_{34}$ of a triangle formed by projections of the points Q3, Q4 and P on the ZY coordinate plane by the following formula:

$S_{34} = a2 \times \Delta h2 \div 2$, where $\Delta h2$ is the height of the triangle;

(8) substituting the formula for calculating the area $S_{34}$ of the triangle in the step 6) into the formula for calculating the area $S_{34}$ of the triangle in the step 7) to obtain $\Delta h2$:

$a2^2 \times \sin B2 \times \sin C2 \div 2 \div \sin A2 = a \times \Delta h2 \div 2$, $\Delta h2 = a2 \times \sin B2 \times \sin C2 \div \sin(180-B2-C2)$, substituting the angle B2=arc tgH/w, the angle C2=arc tgH/r, A2=180−arc tgH/w−arc tgH/r and $a2=w+r-L$ into the formula for $\Delta h2$:

$\Delta h2 = (w+r-L) \times \sin\text{ arc } tgH/w \times \sin\text{ arc } tgH/r \div \sin(180-\text{arc } tgH/w-\text{arc } tgH/r)$, where $\Delta h2$ is the vertical distance from the point P to the reference plane (e) obtained by the points Q3 and Q4;
   (9) calculating an arithmetic mean value of the $\Delta h1$ and $\Delta h2$ to obtain the vertical distance $\Delta h$ from the point P to the reference plane (e);
   (10) calculating a depth Z of the point P by the following formula: $Z = H_k \pm \Delta h$; and
   (11) deciding whether the $\Delta h$ is positive or negative:
   when $L-u-v>0$, $\Delta h$ is positive, when $L-u-v<0$, $\Delta h$ is negative, when $L-r-w>0$, $\Delta h$ is positive, and when $L-r-w<0$, $\Delta h$ is negative.

\* \* \* \* \*